US006131390A

United States Patent [19]

Hsieh

[11] Patent Number: 6,131,390

[45] Date of Patent: Oct. 17, 2000

[54] REAR EXHAUST DEVICE FOR PNEUMATIC TOOL

[76] Inventor: Yu-Fu Hsieh, P.O. Box 96-405, Taipei 106, Taiwan

[21] Appl. No.: 09/231,704

[22] Filed: Jan. 12, 1999

[51] Int. Cl.[7] .......................... F16D 31/02; B23B 45/04; B27C 3/08

[52] U.S. Cl. .............................................. 60/407; 173/169

[58] Field of Search .............................. 60/407; 173/168, 173/169

[56] References Cited

U.S. PATENT DOCUMENTS

| | | | |
|---|---|---|---|
| 3,088,440 | 5/1963 | Wilmer | 173/169 X |
| 4,109,735 | 8/1978 | Bent | 173/169 X |
| 5,797,462 | 8/1998 | Rahm | 173/169 |
| 5,909,016 | 6/1999 | Sterling | 181/230 |
| 5,944,119 | 8/1999 | Hseih | 173/169 X |
| 5,952,623 | 9/1999 | Sterling | 181/230 |
| 5,954,142 | 9/1999 | Rahm | 173/169 |

*Primary Examiner*—John E. Ryznic

[57] ABSTRACT

A rear exhaust device for pneumatic tool, of which the prime feature is that the pneumatic tool has a handle furnished with a control valve; the control valve is mounted in an intake passage of the handle; a threaded sleeve on outer end of the intake passage is connected with an intake connector of an intake pipe; inner end of the intake pipe has a round conduit to be plugged into a cylindrical hole at one end of an intake passage of the dynamic body portion; between the round conduit on inner end of the intake passage in the handle and the outer body portion, an inner exhaust passage is furnished; a compressed air will flow through passages on both sides of a valve seat, an outer exhaust passage, a pressure-shunting ring, and an outer pipe so as to divide the pressure and to provide good intake and exhaust passages to drive the blades and rotor to rotate.

3 Claims, 3 Drawing Sheets

REAR EXHAUST DEVICE FOR PNEUMATIC TOOL

BACKGROUND OF THE INVENTION

1. Field of the Invention

This invention relates to a pneumatic tool, and particularly to a tool having a rear exhaust device with excellent intake and exhaust structure.

2. Description of the Prior Art

In the conventional pneumatic tool, the dynamic force to drive the tool is a compressed air, which enters the dynamic body portion to drive a rotor and blades therein, and then the air will be exhausted out of an exhaust hole. As soon as the compressed air enters the dynamic body portion, the blades will be driven to actuate the rotor to rotate; the rotor will actuate a spindle to turn so as to fulfil a work as expected.

In a conventional pneumatic tool, a compressed air enters a connection seat of the tool via a suitable pipe. By means of a valve, the compressed air enters the dynamic body portion of the tool to drive the blades and rotor so as to actuate a tool to turn or to move back and forth. Whether the blades and the rotor can work perfectly or not is depending upon the intake control assembly, the intake passage, and the exhaust passage to connect with the dynamic body portion; if the answer is "no", the dynamic output thereof is deemed poor.

In a conventional pneumatic tool, the dynamic body portion for the rotor and the blades is usually connected together with the cock and handle; the intake connector is directly screwed together with the intake end of the dynamic body portion. The rotor and the blades are mounted in the cylinder sleeve; a compressed air is used for driving the blades to turn, and then it will be exhausted via a passage of the dynamic body portion; it is called as front exhaust pneumatic tool; such a pneumatic tool usually causes considerable noise during working. Another kind of such tool has an exhaust passage formed between the inner wall and the cylinder sleeve, and extended to the rear end of the control valve. The outer end of the dynamic body portion is mounted with an outer pipe for exhausting air to the tail end, and such a pneumatic tool may be referred to as a rear-exhaust pneumatic tool; it usually has a lower noise during operation.

In the conventional rear-exhaust pneumatic tool, the handle is also used as the dynamic body portion thereof, and such structure can merely be used in some pneumatic tools, and it is unable to be used in a tool requiring increasing pressure.

SUMMARY OF THE INVENTION

The prime object of the present invention is to provide a rear exhaust device for pneumatic tool, in which one side of the dynamic body portion is furnished with a connection portion to be screwed together with the handle; the connection portion has a center cylinder member, which is furnished with an intake passage, and with two exhaust passages on both sides thereof. The handle and the connection portion of the dynamic body portion are connected together by means of a round conduit to be connected hermetically with a cylindrical hole on outer end of the center cylinder member of the connection portion; the handle is furnished with a cock and a control valve so as to facilitate compressed air to flow through the round conduit and an intake passage of the connection portion of the dynamic body portion, and finally to flow into the cylinder sleeve; then, the compressed air can flow through the exhaust passage formed between the cylinder member of the connection portion and the body portion, the inner exhaust passage between the round conduit of the handle and the body portion, the passage outside the control valve, and the outer pipe mounted on the outer end of the handle so as to provide a complete passage system for the compressed air.

Another object of the present invention is to provide a rear exhaust device for pneumatic tool, in which a valve seat is furnished laterally on the handle near the exhaust end; the valve seat is used for mounting a control valve to control the intake volume. Both sides of the valve seat are furnished with two symmetrical outer exhaust passages, which are in communication with the inner exhaust passage on the front end of the handle; air exhausted out of the dynamic body portion can flow and exhaust smoothly through the inner-ring passage and the outer pipe connected with the pressure-shunting ring.

Still another object of the present invention is to provide a rear exhaust device for pneumatic tool, in which the end of the body portion of the handle is furnished with outer threads; the inner surface of the connection portion is furnished with inner threads to be engaged with the aforesaid outer threads. A positioning nut is mounted between the body portion of the handle and the connection portion of the dynamic body portion. As soon as a proper position between the handle and the dynamic body portion is adjusted and set, the positioning nut will be fastened in place; in other words, the positioning nut provides an adjustment function between the dynamic body portion and the handle.

A further object of the present invention is to provide a rear exhaust device for pneumatic tool, in which the center of the connection portion has a cylinder member furnished with rib plates connected with the outer body portion; the rib plates form two exhaust passages between the cylinder member and the body portion; the two exhaust passages are in communication with that of the cylinder sleeve so as to facilitate the compressed air to be exhausted directly.

A still further object of the present invention is to provide a rear exhaust device for pneumatic tool, in which the center of the connection portion has a cylinder body; between the cylinder body and the outer body portion, there are rib plates; one end of the cylinder member has a cylindrical hole, of which the inner side has an intake passage extended along the rib plates; the tail end of the intake passage extends to the outer end of the bearing block on one side of the cylinder sleeve. An intake hole is furnished along the ring-shaped groove of the bearing block so as to have the compressed air flowed into the cylinder sleeve, and to drive the blades to actuate the rotor to turn.

Yet another object of the present invention is to provide a rear exhaust device for pneumatic tool, in which the connection end between the handle and the connection portion of the dynamic body portion has a round conduit, which isolates the intake passage from the inner exhaust passage. The length of the round conduit of the handle is longer than the outer thread end of the body portion. The handle is connected with the cylindrical hole of the connection portion of the dynamic body portion by means of the round conduit. After the threads of the outer body portion being connected and positioned in place, the O-ring and groove on the inner surface of the cylindrical hole mounted between the round conduit and the cylindrical hole will be set in place hermetically; in other words, the dynamic body portion and the handle can be assembled and positioned in place quickly and easily.

Yet still another object of the present invention is to provide a rear exhaust device for pneumatic tool, in which the tail end of the handle has a connection cylindrical hole, of which the center is furnished with a threaded sleeve to be engaged with a threaded end of the intake connector. The connection cylindrical hole has an O-ring groove for receiving an O-positioning ring so as to fasten the outer pipe and the pressure-shunting ring of the muffling cotton together, and to provide a guide function to the compressed air to intake and exhaust, and to provide a muffling function thereof.

DETAILED DESCRIPTION OF THE PREFERRED EMBODIMENT

Figure 1:
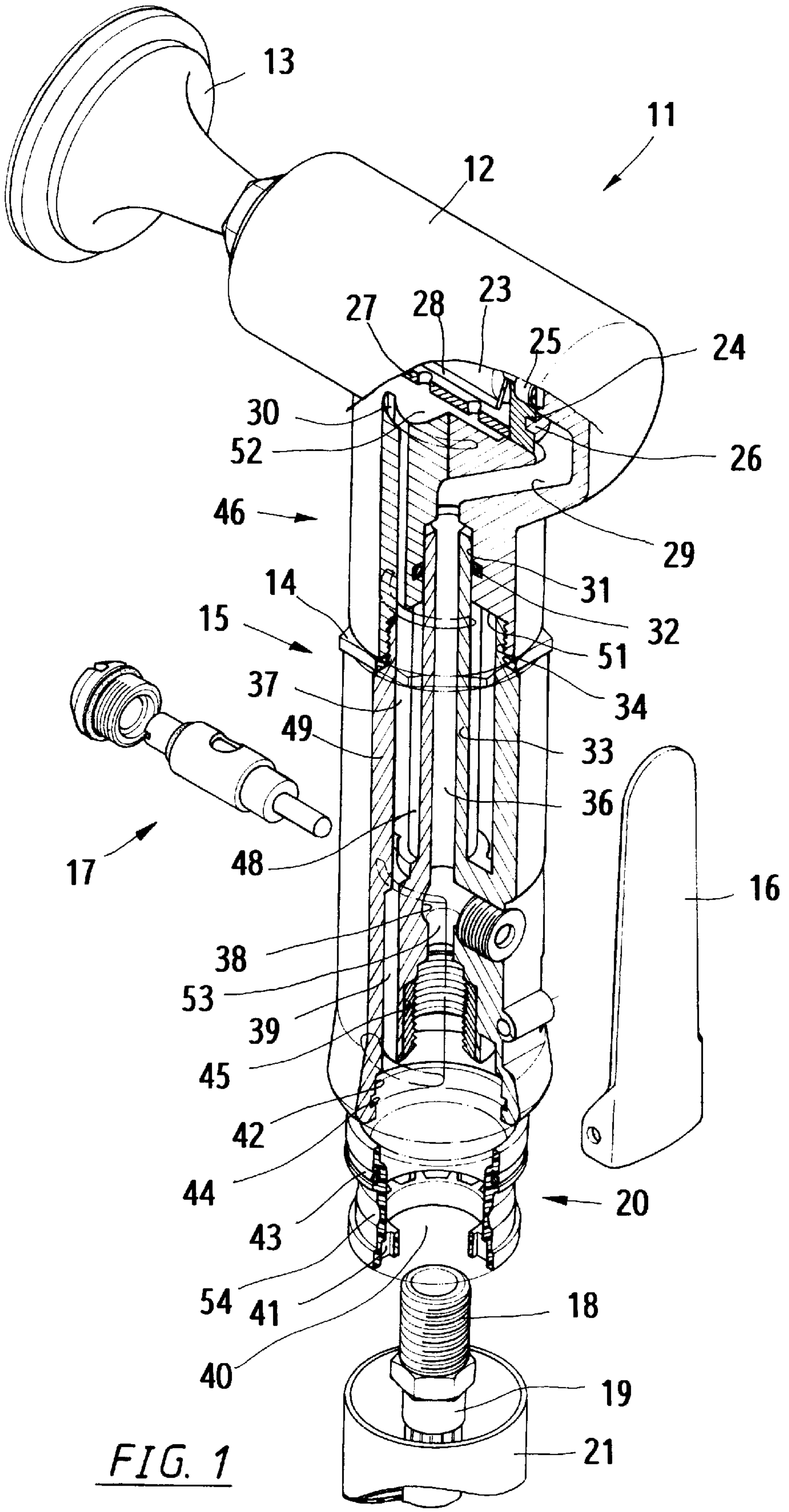
FIG. 1 is a fragmental section view and perspective view of the present invention, showing the connecting structure between the handle of the rear exhaust device and the dynamic body portion in the pneumatic tool.
Figure 2:
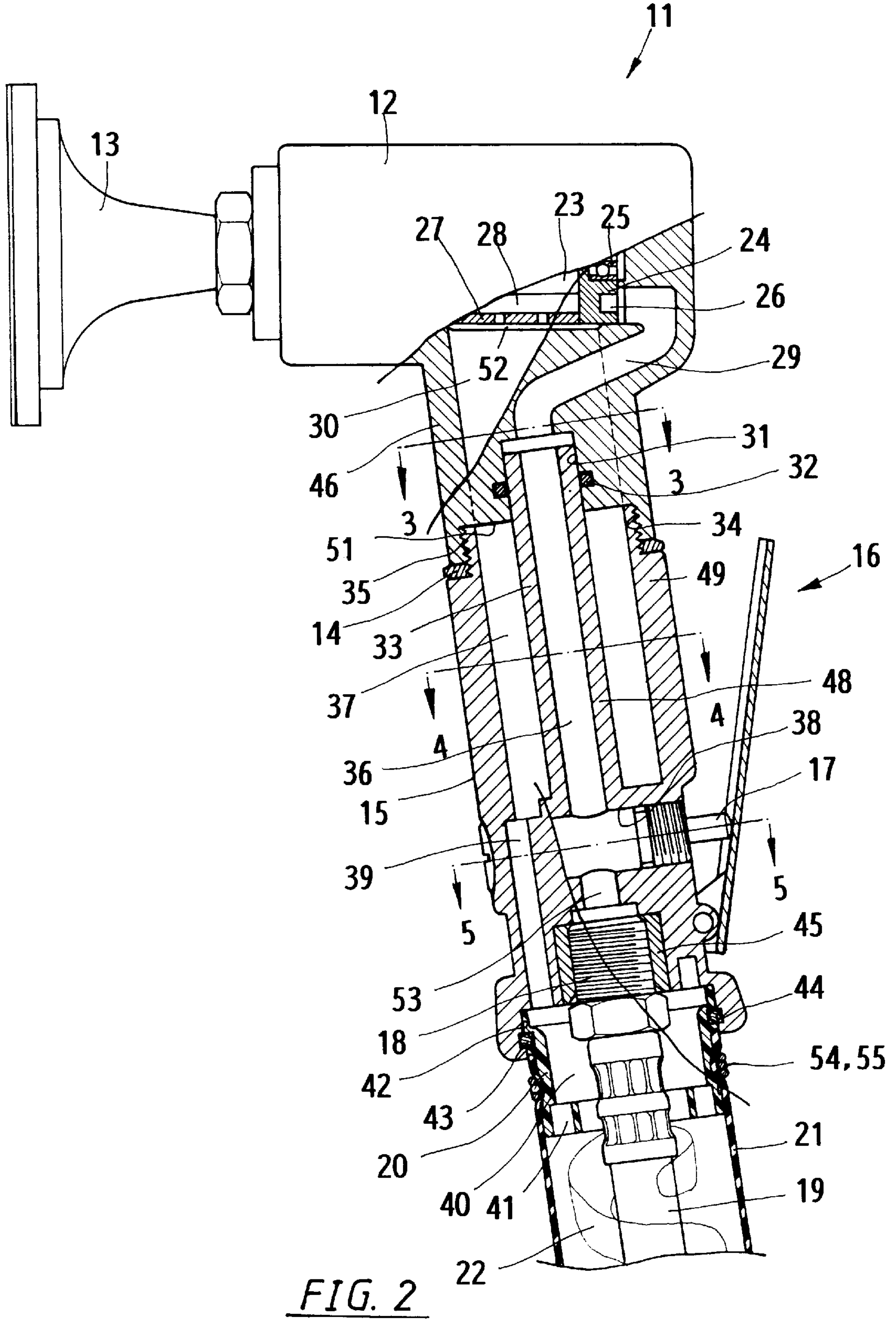
FIG. 2 is a fragmental section view of the present invention, showing the connecting structure between the handle of the rear exhaust device and the dynamic body portion in the pneumatic tool.
Figure 3:
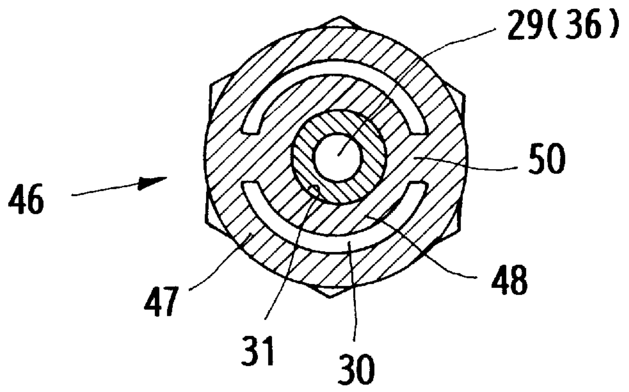
FIG. 3 is a sectional view of the present invention taken alone line 3—3 in FIG. 2.
Figure 4:
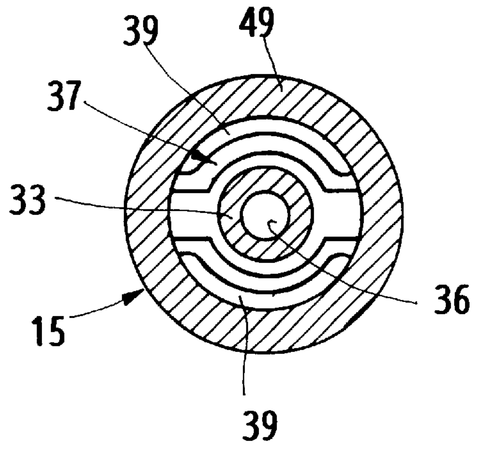
FIG. 4 is a sectional view of the present invention taken alone line 4—4 in FIG. 2.
Figure 5:
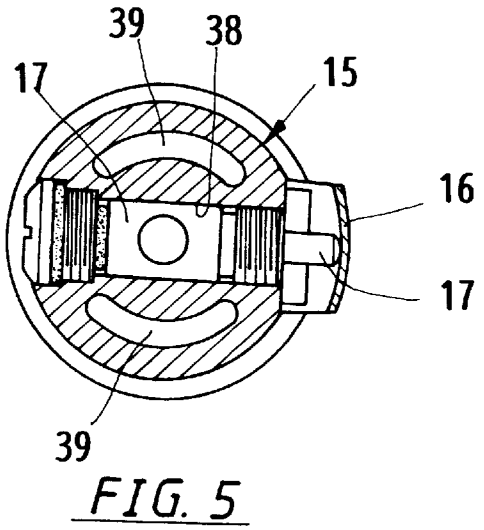
FIG. 5 is a sectional view of the present invention taken alone line 5—5 in FIG. 2.

Referring to FIGS. 1 to 5, this invention relates to a rear exhaust device for pneumatic tool 11, which mainly comprises a dynamic body portion 12 and a tool 13 mounted on the front end of the body portion by means of threads. The spindle of the tool 13 extends directly to the rotor 23 of the dynamic body portion 12; the rotor 23 is driven with a compressed air through blades 28 so as to drive the rotor 23 to turn at a high speed, and then the tool 13 on the front end of the dynamic body portion 12 will do a job.

The rotor 23 and the blades 28 in the dynamic body portion 12 are mounted fixedly between two bearing blocks 24, and the outside thereof is covered with a cylinder sleeve 27. The compressed air enters from one end of an intake passage 29, and will enter the cylinder sleeve 27 along an intake hole on a ring-shaped groove 26 of the bearing block 24 so as to drive the blades 28 and the rotor 23 to rotate. When the compressed air enters the cylinder sleeve 27 to drive the blades 28, the compressed air must, via an exhaust hole of the cylinder sleeve 27, be exhausted into an exhaust passage 30 of a connected portion 46 of the dynamic body portion 12 so as to drive the blades 28 and the rotor 23 to move. In the event of the exhaust passage 30 being not furnished properly or being blockaded more or less, the flow of the compressed air will be hindered.

The dynamic body portion 12 extends at a suitable angle to a connection portion 46; the center of the connection portion 46 is furnished with a cylinder member 48; between the cylinder member 48 and the outer body portion 47, there are symmetrical rib plates 50. From a seat surface 51 to a ring-shaped groove 52 of the cylinder sleeve 27, there are two exhaust passages 30 between the cylinder member 48 and the body portion 47. One end of the connection portion 46 is furnished with inner threads 34 extended to the seat surface 51, and the inner threads 34 enables connection between the dynamic body portion 12 and a handle 15. The center of the cylinder member 48 has a cylindrical hole 31 extended from the seat surface 51 to the inside thereof; an intake passage 29 extends to the tail end of the dynamic body portion 12; the diameter of the cylindrical hole 31 on the outer end of the intake passage 29 is so designed as to fit the outer diameter of the round conduit 33 of the handle 15. The inside of the cylindrical hole 31 is furnished with an O-ring and groove 32, which is used for hermetic seal after the round conduit 33 of the handle 15 being connected in place.

In the handle 15, a round conduit 33 extends from the outer seat surface of a valve seat 38 to the upper part thereof; the outside thereof has a body portion 49 with a suitable diameter. The round conduit 33 and the body portion 49 form into an inner exhaust passage 37. The round conduit 33 in the center of the handle 15 is longer than that of the outer body portion 49 to form into projected part, and the diameter of that projected part is so designed as to fit the diameter of the cylindrical hole 31 of the connection portion 46; the projected part is directly connected with the cylindrical hole 31. The O-ring and groove 32 in the cylindrical hole 31 provides a hermetic function.

One end of the body portion 49 of the handle 15 is furnished with outer threads 35 to be engaged with the inner threads 34 on the connection portion 46 of the dynamic body portion 12. Before the handle 15 being connected with the connection portion 46, the outer threads 35 on the handle 15 has to mount with a positioning nut 14, and then the inner threads 34 of the connection portion 46 is engaged with the same. The position between the tool 13 on the front end of the dynamic body portion 12 and the cock 16 of the handle 15 can be adjusted by means of the two thread portions; then, turn the positioning nut 14 towards the connection portion; 46 so as to fix the position of the handle 15 and the dynamic body portion 12.

In the connection portion 46 between the handle 15 and the dynamic body portion 12, the round conduit 33 in the center of the handle 15 is plugged into the center cylindrical hole 31 in the connection portion 46, and then mount the round conduit 33 into the cylindrical hole 31. Between the round conduit 33 and the cylindrical hole 31, the O-ring and groove 32 is mounted for sealing the aforesaid two parts. The outside thereof is mounted with the positioning nut 14 for fastening and positioning. The intake passage 29 in the cylindrical hole 31 of the connection portion 46 is used for filling a compressed air via an intake passage 36 of the round conduit 33. The exhaust passage 30 between the cylinder member 48 and the body portion 47 is in communication with the inner exhaust passage 37 of the handle 15 so as to facilitate the compressed air to exhaust out.

The body portion 49 of the handle 15 is furnished with a valve seat 38 perpendicular to the body portion 49. The valve seat 38 is mounted with a control valve 17, which divides the intake passage 36 into two sections; one end of the outer section of the intake passage 53 has a threaded sleeve 45 to be connected with an intake connector 18 of the intake pipe 19. The compressed air can flow via the intake pipe 19 and the intake passage 53 of the handle 15, but it is unable to enter the cylinder of the dynamic body portion 12 in communication with the intake passage 36 as a result of being blockaded with the control valve 17; however, the compressed air can be controlled to enter therein by means of the cock 16 on the handle 15 to push the valve rod of valve 17 for opening the passage in a given cross-sectional area; therefore, the speed of the blades 28 and the rotor 23 can be controlled, and then the speed of the tool 13 can be controlled properly.

The intake passage 36 in the round conduit 33 can be in communication with the outer intake passage 53 via the control valve 17. An outer exhaust passage 39 is furnished between the lateral valve seat 38 and the body portion 49. The outer exhaust passage 39 is in communication with the inner exhaust passage 37 outside the round conduit 33. The outer end of the outer exhaust passage 39 is in communication with the inner-ring 20 to facilitate the compressed air to be exhausted; the compressed air entered will drive the blades 28 to actuate the rotor 23 to turn without being hindered.

The outer end of the threaded sleeve 45 in the handle 15 is furnished with a connecting cylinder 42 with an O-ring groove 44; the connecting cylinder 42 is to be mounted with a pressure-shunting ring 20 of an outer pipe 21. An O-positioning ring 43 is to be mounted in the O-ring groove 44 of the connecting cylinder 42.

The threaded sleeve 45 of the handle 15 is connected with the intake connector 18 on one end of the intake pipe 19; the connecting cylinder 42 is connected with the pressure-shunting ring 20. The intake pipe 19 and the pressure-shunting ring 20 are two separate members. The outer surface of the pressure-shunting ring 20 has a ring groove 54 to facilitate connecting one end of an outer pipe 21, which is fastened in place with a pipe clamp 55. The inner surface of the pressure-shunting ring 20 is furnished with an inner-ring passage 40, while the outer end thereof is furnished with a pressure-shunting plate 41. The intake pipe 19 passes through the inner-ring passage 40, and then it is connected with the threaded sleeve 45 by using an intake connector 18. The intake pipe 20 is covered with a muffling cotton 22 near the outer end of the pressure-shunting ring 20, and the muffling cotton 22 is mounted inside the outer pipe 21.

During the pneumatic tool 11 in operation, the intake pipe 19 is connected with the output end of an air compressor; the compressed air will pass through the control valve 17, and the intake passage 36 of the round conduit 33 in the handle 15 to enter intake passage 29 of the connection portion 46 of the dynamic body portion 12; then, the compressed air will enter the cylinder sleeve 27 from one end thereof so as to drive the blades 28 and the rotor 23 to turn, i.e., to provide the tool 13 with a dynamic force. After the compressed air enters the cylinder sleeve 27 via the control valve 17, it will flow into the ring-shaped groove 52 via the exhaust hole of the cylinder sleeve 27, and then passes through the exhaust passages 30 on both sides of the cylinder member 48 of the connection portion 46 in the dynamic body portion 12, the inner exhaust passage 37 of the handle 15, the outer exhaust passage 39 on both sides of the valve seat 38, the pressure-shunting ring 20 on tail end of the handle 15, and finally passes through the pressure-shunting plate 41 of the pressure-shunting ring 20 for reducing vibration, and the tail end of the outer pipe 21. Finally, the air exhausted will be muffled by means of the pressure-shunting plate 41 of the pressure-shunting ring 20 and the muffling cotton 22 so as to reduce the exhausting noise to a minimum.

The pneumatic tool 11 according to the present invention has a wide passage between the handle 15 and the connection portion 46 of the dynamic body portion 12. The compressed air can directly flow through the intake pipe 19 and to the cylinder sleeve 27, and the air exhausted out of the cylinder sleeve 27 can also flow out smoothly so as to provide the rotor with a effective rotation by means of the compressed air, i.e., the pneumatic tool 11 can yield a better working efficiency; further, the holding position to the tool can easily be adjusted by adjusting the connection between the dynamic body portion 12 and the handle 15.

According to the aforesaid description to the embodiment of the present invention, the features and structure thereof have been disclosed fully; it is apparent that the present invention has provided an evident improvement to the tool of the kind as a result of its unique structure, which is never anticipated and designed by any person, who is skilled in the tool of the kind.

What is claimed is:

1. A rear exhaust device for pneumatic tool mainly comprising a dynamic body portion and a connection portion perpendicular to said dynamic body portion; outer end of said connection portion furnished with outer threads which to be engaged together with inner threads on one end of a handle; center of a cylinder member having a cylindrical hole for receiving a round conduit; an intake passage of said handle having a valve seat for receiving a control valve to control compressed air to flow through; one end connected with said connection portion of said dynamic body portion, while other end connected with an intake pipe and an outer pipe, and features thereof including:

center of said connection portion furnished with a cylinder member which having symmetrical rib plates connected with outer body portion; said cylinder member extended from a seat surface to an O-ring groove outside a cylinder sleeve so as to divide a passage between said cylinder member and said body portion into two exhaust passages; one end of said connection portion outside said body portion furnished with inner threads; a cylindrical hole furnished from a seat surface of said inner threads of said cylinder member; surface of said cylindrical hole furnished with an O-ring and groove; one end of said handle furnished with threads to be engaged with inner threads of said connection portion of said dynamic body portion; center thereof furnished with a round conduit extended from said intake passage of said valve seat; said round conduit having a projected part out of said body portion, and center thereof having an intake passage; a round inner exhaust passage furnished between said round conduit and said body portion; said inner exhaust passage being in direct communication with said exhaust passage of said connection portion; both sides of said valve seat in said handle having two outer exhaust passages respectively and extended backwards; said outer exhaust passage being in communication with said inner exhaust passage outside of said round conduit; outer end of said handle having a connecting cylinder to connect with a pressure-shunting ring, and center thereof furnished with a threaded sleeve to be connected with an intake connector; said handle being in communication with said outer exhaust passage by means of two passages on both sides of said valve seat; a ring-shaped inner exhaust passage being in communication with said outer exhaust passage directly; compressed air flowing via said control valve, and said intake passage, an intake passage of said cylinder member in said connection portion and finally entering said cylinder sleeve, and after said compressed air driving said blades and said rotor, and the same being exhausted to said pressure-shunting ring and said outer pipe connected with tail end of said handle.

2. A rear exhaust device for pneumatic tool as claimed in claim 1, wherein one end of said handle near said body portion is furnished with outer threads at a suitable length; said outer threads to be engaged and connected with inner threads at one end of said body portion of said connection portion upon first being mounted with a positioning nut; after said dynamic body portion and said handle being connected together, said positioning nut being used to position said two members in place.

3. A rear exhaust device for pneumatic tool as claimed in claim 1, wherein said round conduit in said handle extends out of said outer threads of said body portion at a suitable length; after said handle and said connection portion of said dynamic body portion being screwed and connected together, one end of said round conduit plugged into a cylindrical hole of said cylinder member in said connection portion of said dynamic body portion; an O-ring in said cylindrical hole being in close contact with surface of said round conduit.

* * * * *